United States Patent [19]

Horiike et al.

[11] 4,336,170

[45] Jun. 22, 1982

[54] METHOD OF TREATMENT OF AN AQUEOUS DISPENSION OF MICROCAPSULES

[75] Inventors: Tetsuro Horiike; Tomoyuki Okimoto; Tomoharu Shiozaki, all of Amagasaki, Japan

[73] Assignee: Kanzaki Paper Manufacturing Co., Ltd., Tokyo, Japan

[21] Appl. No.: 181,835

[22] Filed: Aug. 27, 1980

[30] Foreign Application Priority Data

Aug. 27, 1979 [JP] Japan .......................... 54/109378[U]

[51] Int. Cl.³ .............................................. C08L 61/20
[52] U.S. Cl. .................................... 521/55; 528/230; 528/488; 528/487; 521/64; 521/187
[58] Field of Search ................. 260/29, 6 PT, 29.4 R; 528/230, 488, 487

[56] References Cited

U.S. PATENT DOCUMENTS 3,516,941  6/1970  Matson ........................... 260/29.7 R Primary Examiner—Melvyn I. Marquis
Attorney, Agent, or Firm—Cushman, Darby & Cushman

[57] ABSTRACT

The residual formaldehyde existing in the aqueous dispersion of microcapsules each having a capsule wall of an aldehyde polycondensation resin formed by polycondensation of formaldehyde with an amine in the presence of an acid catalyst is removed by adjusting the aqueous dispersion to an alkaline state, adding to the aqueous dispersion at least one reaction catalyst which is a member selected from the group consisting of metal hydroxides, phosphates, calcium salts and magnesium salts, and then heating and agitating the aqueous dispersion to cause a reaction to remove residual formaldehyde therefrom.

9 Claims, No Drawings

4,336,170

METHOD OF TREATMENT OF AN AQUEOUS DISPENSION OF MICROCAPSULES

BACKGROUND OF THE INVENTION

This invention relates to a method for treating an aqueous dispersion of microcapsules, and more particularly to a method for removing residual formaldehyde from an aqueous dispersion of microcapsules each having a capsule wall of an aldehyde polycondensation resin formed by polycondensation of formaldehyde and an amine in the presence of an acid catalyst.

Microcapsules find their usefulness in various fields such as pressure-sensitive copying papers, heat-sensitive recording papers, adhesives, fertilizers, pharmaceuticals, foods, cosmetics, etc. There are various known methods for making microcapsules useful for those purposes. Among them, there are included the "coacervation" method, the "interfacial polycondensation" method and the "in-situ polymerization" method. It is also known that microcapsules each having a capsule wall of an aldehyde polycondensation resin formed by polycondensation of formaldehyde with an amine are superior in the water resistance and the solvent resistance. For example, U.S. Pat. No. 3,516,941 and South African Patent Specification No. 62-939 disclose a method of making microcapsules in which urea-formaldehyde polycondensation resin capsule walls are formed through the utilization of the "in-situ polymerization" technique. Japanese Laid-Open Patent Publication No. 9,079 of 1976 discloses another method of making microcapsules in which urea-formaldehyde polycondensation resin capsule walls are formed by utilizing a system modifier. Japanese Patent Publication No. 12,380 of 1962, Japanese Patent Publication No. 12,518 of 1963 and Japanese Patent Publication No. 4,717 of 1973 disclose some methods of effectively performing aldehyde polycondensation reaction at an oil-water interface by utilizing chemical or physicochemical bonding. UK Patent Specification No. 1,190,721 discloses another method of making microcapsules in which complex capsule walls are formed from a suspensible polymer and a hydrophilic polymer by a reaction of a polyhydroxy phenol with an aldehyde. Japanese Patent Publication No. 51,714 of 1972 discloses a method for forming polycondensation resin capsule walls by precipitating polyvinyl alcohol and a polyhydroxy phenol through the utilization of a face separation agent and then carrying out polycondensation with an aldehyde. Japanese Laid-Open Patent Publication No. 57,892 of 1973 discloses a method of making microcapsules in which calsule walls are formed of a polymerization product obtained by coagulation reaction between an aldehyde and a polyhydroxy phenol complexed with polyvinyl alcohol. Japanese Laid-Open Patent Publication No. 20,069 of 1972 discloses a method for polycondensation of polyamine and an aldehyde through the utilization of the "interfacial polycondensation" method.

Among aldehydes useful for forming aldehyde polycondensation resin capsule walls in the above-mentioned methods, there are included formaldehyde, acetaldehyde, butyraldehyde, crotonaldehyde, benzaldehyde, glutaraldehyde and furfural. Formaldehyde is most preferably used because of its good wall and film forming ability. However, on the other hand, the utilization of formaldehyde is disadvantageous because of its pungent odor and poisonous character. The laws provide strict restrictions for the utilization of formaldehyde. It is therefore desirable to prepare an aqueous dispersion of microcapsules in such a manner that substantially no residual formaldehyde exists therein. However, in order to form capsule walls having the desired good properties it is essential to utilize an excess amount of formaldehyde, consequently the existence of a certain amount of residual formaldehyde in the microcapsule dispersion is inevitable. Apparently, this greatly restricts the usefulness of the microcapsule dispersions.

An attempt has been made to remove the residual formaldehyde from an aqueous dispersion of microcapsules having capsule walls of an aldehyde polycondensation resin. Japanese Laid-Open Patent Publication No. 5,874 of 1979 discloses a method of removing an excess amount of formaldehyde from an urea-formaldehyde polycondensation capsule wall microcapsule dispersion by adding thereto hydroxylamine sulfate and then adjusting the system in an alkaline state. In this method, the agent for removing formaldehyde is limited to hydroxylamine sulfate. In addition, according to our study with some experiments, it has been found that the adjustment of the microcapsule dispersion in an alkaline state tends to reduce the solvent resistance of the microcapsules.

The principal object of the invention is to provide an improved method for removing residual formaldehyde from an aqueous dispersion of microcapsules each having a capsule wall of an aldehyde polycondensation resin formed by polycondensation of formaldehyde with an amine in the presence of an acid catalyst.

Another object of the invention is to provide a method for effectively removing residual formaldehyde from an aqueous dispersion of microcapsules of the kind described by a chemical modification treatment without sacrificing the superior properties of the capsule walls.

A further object of the invention is to provide a method for accelerating the reaction to remove residual formaldehyde from an aqueous dispersion of microcapsules of the kind described.

Other objects and advantages of the invention will become apparent from the following detailed description.

SUMMARY OF THE INVENTION

According to the invention, the method for removing residual formaldehyde from an aqueous dispersion of microcapsules each having a capsule wall of an aldehyde polycondensation resin formed by polycondensation of formaldehyde with at least one amine in the presence of an acid catalyst comprises the steps in combination of: adjusting said aqueous dispersion in an alkaline state, adding to said aqueous dispersion at least one reaction catalyst which is a member selected from the group consisting of metal hydroxides, phosphates, calcium salts and magnesium salts, and heating and agitating said aqueous dispersion to cause a reaction to remove residual formaldehyde therefrom. Preferably in the aqueous dispersion there co-exists with said reaction catalyst at least one member selected from the group consisting of saccharides, their derivatives and acetoin.

DETAILED DESCRIPTION OF THE INVENTION

The method for removing residual formaldehyde from an aqueous dispersion of microcapsules according to the invention is applicable to any aqueous dispersions of microcapsules so far as each of the microcapsules has a capsule wall of an aldehyde polycondensation resin formed by polycondensation of formaldehyde with at least one amine in the presence of acid catalyst. Such microcapsule dispersions like this may be prepared by any known and conventional methods. Among the typically useful acid catalysts, there may be included water-soluble acids such as formic acid, acetic acid, citric acid, p-toluenesulfonic acid, hydrochloric acid, sulfuric acid, pectic acid, carboxymethylcellulose, polyacrylic acid, hydrolysis products of maleic acid copolymers and the like.

The material which participates in forming an aldehyde polycondensation resin wall film by polycondensation thereof with formaldehyde may be of any known type. Among preferred materials for this purpose, there are included amines such as urea, thiourea, guanidine, dicyandiamide, biuret cyanamide and melamine. The most preferred materials are urea and melamine.

The aqueous dispersions of microcapsules thus prepared usually have a relatively low pH value such as 5.5 or lower. It is impossible or extremely difficult to remove formaldehyde from the microcapsule dispersion in a lower pH range, i.e., less than 5.5. According to the invention, the pH of the aqueous dispersion of microcapsules is adjusted at 11.0 or higher before conducting a modification treatment to remove formaldehyde. It is unnecessary to excessively raise the pH value. Usually the pH value for the treatment for removing formaldehyde may be adjusted to within the range of 11.0 to 13.5. Various alkaline materials such as caustic soda, ammonium and amines may be used for adjusting the pH of the aqueous dispersion of microcapsules. It is also possible to utilize as a pH adjusting agent the reaction catalyst which is used in the step of carrying out the reaction for removing formaldehyde according to the invention.

The reaction catalyst which is used for the reaction to remove formaldehyde according to the invention may be a member selected from the group consisting of metal hydroxides, phosphates, calcium salts and magnesium salts. Among useful metal hydroxides, there are included lithium hydroxide, potassium hydroxide, calcium hydroxide, magnesium hydroxide, barium hydroxide, thallium hydroxide and lead hydroxide. Metal oxides which change in water to metal hydroxides may also be useful. Among useful phosphates, there are included potassium hydrogen phosphate, potassium dihydrogen phosphate, calcium hydrogen phosphate and calcium dihydrogen phosphate. Among useful calcium salts, there are included calcium carbonate, calcium chloride, calcium nitrate and calcium sulfate. Among useful magnesium salts, there are included magnesium carbonate, magnesium nitrate, magnesium sulfate, magnesium chloride and magnesium acetate. Those compounds as the reaction catalyst may be used solely or in combination. Usually metal hydroxides are preferred, especially, hydroxides of alkaline earth metals are most preferred, because they are particularly effective to remove formaldehyde. There is no substantial limitation about the amount of the reaction catalyst added to the microcapsule dispersion. The amount of the reaction catalyst depends on the kind of the reaction catalyst used, the kind of the microcapsule dispersion to be treated and other conditions. However, usually the amount of the reaction catalyst used may be within the range of about 0.01 to 10 mols per 1 mol of residual formaldehyde in the microcapsule dispersion. In some cases, a substantially satisfactory effect can be obtained even with use of the reaction catalyst in such a small amount as 0.01 mol or smaller per 1 mol of residual formaldehyde. According to the invention, the use of a formaldehyde absorbent in a large amount which has been required in the conventional technique is unnecessary. Accordingly, the degradation of the quality of microcapsules can be avoided and the capsule dispersion can be prevented from becoming highly viscous.

According to the invention, the aqueous dispersion of microcapsules while or after adding the reaction catalyst thereto is stirred at an elevated temperature higher than 30° C. Since an excessive heating is undesirable because it results in degrading the quality of the microcapsules, the heating may preferably be controlled at a temperature lower than 60° C. The time for heating and agitation of the microcapsule dispersion for carrying out the reaction for removing formaldehyde therefrom depends on various conditions for the reaction but usually several hours would be sufficient to substantially completely remove formaldehyde from the aqueous dispersion of microcapsules.

According to the inventors' further study and investigation, it has been found that the time required for the reaction for removing formaldehyde from the microcapsule dispersion can be remarkably reduced by the utilization of a specified reaction accelerator in the co-existence of the before-mentioned reaction catalyst. The specified reaction accelerator may be at least one member selected from the group consisting of saccharides, their derivatives and acetoin.

Among the useful saccharides, there are included monosaccharides such as trioses, e.g., glyceric aldehyde and dioxiacetone, tetroses, e.g., erythrose, threose and erythreose, pentoses e.g., ribose, arabinose, xylose, lyxose, xylulose and ribulose, and hexoses, e.g., allose, altrose, glucose, mannose, gulose, idose, galactose, talose, fructose, sorbose, psicose and tagatose; oligosaccharides such as maltose, isomaltose, cellobiose, gentiobiose, melibiose, lactose, turanose, sophorose, laminaribiose, allolactose, lactulose, primeverose, vicianose, rutinose, epimelibinose, trehalose, isotrehalose, neotrehalose, saccharose, isosaccharose, manninotriose, cellotriose, robiniose, rhamninose, gentianose, raffinose, melezitose, planteose, cellotetrose, stachyose; and derivatives thereof such as sugar ether, e.g., methylglucose, dimethylglucose and trimethyl glucose, deoxysugar e.g., rhamnose and fucose, and amino sugar e.g., D-glucosamine, D-chondrosamine and D-fructosamine. The most preferred accelerator for performing the reaction to effectively remove formaldehyde is fructose, glucose and maltose. The reaction accelerator may be used in an amount of about 0.1 to 10 parts by weight, preferably 0.5 to 3 parts by weight, with respect to one part by weight of the reaction catalyst.

The steps of adjusting the pH of the microcapsule dispersion, adding a reaction catalyst to the dispersion, adding a reaction accelerator to the dispersion, heating the dispersion and agitating the dispersion according to the invention may be carried out either sequentially or concurrently.

Thus according to the invention, the residual formaldehyde existing in the microcapsule dispersion can be effectively removed therefrom by use of a relatively small amount of each of the reaction catalyst and the reaction accelerator and by an agitation treatment at an elevated temperature under relatively mild conditions without causing the properties of the capsule walls to be degraded. The usefulness of the microcapsules having aldehyde polycondensation resin capsule walls can be remarkably widened and expanded.

DETAILED DESCRIPTION OF THE PREFERRED EMBODIMENT

The following examples serve to illustrate the invention in more detail although the invention is not limited to the examples. Unless otherwise indicated, parts and % signify parts by weight and % by weight, respectively.

EXAMPLE 1

150 parts of 5% aqueous solution of anion modified polyvinyl alcohol (Gohsenol T-350 manufactured by Nippon Gosei Kagaku Kogyo Kabushiki Kaisha), 5 parts of urea and 0.5 parts of resorcin were added into a mixing vessel equipped with a heater to obtain a homogeneous solution. The pH of this solution was adjusted to 3.4 with 10% hydrochloric acid to prepare a medium for producing capsules. On the other hand, 2 parts of crystal violet lactone and 0.5 parts of benzoyl leucomethylene blue were dissolved in 70 parts of alkyl naphthalene (KMC oil manufactured by Kureha Kagaku Kogyo Kabushiki Kaisha, Japan) to prepare an oily solution. The oily solution was dispersed in the above medium to obtain an emulsion containing oily capsule core materials which have an average particle size of 6 microns. To the emulsion 12.5 parts of 37% aqueous solution of formaldehyde was added. The mixture was heated up to 55° C. with gently stirring, maintained at the same temperature for 2 hours and then cooled on standing to prepare a capsule dispersion, which had a pH of 3.5 and a sharp irritant odor of formaldehyde. It was very unpleasant.

The pH of the capsule dispersion was adjusting to 12.0 with 20% aqueous solution of sodium hydroxide and 0.5 parts of calcium hydroxide and 0.5 parts of fructose were added in the dispersion. The mixture was gently stirred at 40° C. for 2 hours. The irritating odor of the dispersion disappeared after about one hour stirring. To the resultant dispersion, 9 parts (solid content) of aqueous solution of hydroxyethyl cellulose and 20 parts of fine cellulose powder were added with respect to 100 parts of capsule core materials to prepare a capsule coating composition.

CONTROL 1

Example 1 was repeated except that the capsule dispersion was not treated according to the invention to obtain a capsule coating composition.

Each of the coating compositions prepared in Example 1 and Control 1 was coated on one surface of paper sheet of 40 g/m² in an amount of 4 g/m² on dry basis and dried at 120° C. for 30 seconds to obtain a capsule coated sheet.

The formaldehyde in the resultant capsule coated sheet was determined by the "acetylacetone method", in which the capsule coated sheet was finely cut according to the Welfare Ministry ordinance No. 34, 2.5 g of the sheet was eluted with 100 ml of distilled water at 40° C. for one hour, the impurities were removed by centrifugation, 5.0 ml of the supernatant fraction was added to 5.0 ml of acetylacetone solution, the mixture was heated at 40° C. for 30 minutes and allowed to stand for 30 minutes, and then the absorbance of it was determined at 415 nm.

While 560 ppm of formaldehyde was detected from the capsule coated sheet of Control 1, only 25 ppm of formaldehyde was detected from the capsule coated sheet of Example 1. It was confirmed that formaldehyde was effectively removed by the present inventive method.

Further, the heat resistance, humidity resistance and solvent resistance of the capsule coated sheets were examined. It was not found that the capsule coated sheet obtained in Example 1 deteriorated in the qualities.

EXAMPLES 2 TO 9 AND CONTROLS 2 TO 3

Example 1 was repeated except that the compounds and amounts of reaction catalyst and reaction accelerator, and the pH, heating temperature and treating time of the capsule dispersion were changed to those indicated in Table 1 to obtain capsule coated sheets. The formaldehyde in the resultant capsule coated sheets was determined by the same method as in Example 1. The results are shown in Table 1.

As shown in Table 1, the residual formaldehyde of the capsule dispersions obtained in each Example according to the invention was effectively removed. The capsule coated sheets obtained in Examples did not deteriorated in the qualities such as heated resistance, humidity resistance and solvent resistance.

TABLE 1

| | Reaction catalyst | | Reaction accelerator | | PH | Temperature (°C.) | Time (hrs) | Formaldehyde (ppm) |
|---|---|---|---|---|---|---|---|---|
| | Compound | amount | Compound | amount | | | | |
| Example 1 | Calcium hydroxide | 0.5 | Fructose | 0.5 | 12 | 30 | 2 | 25 |
| Example 2 | Calcium hydroxide | 2 | None | — | 12 | 40 | 6 | 42 |
| Example 3 | Lithium hydroxide | 1.5 | Fructose | 1.5 | 12 | 60 | 7 | 8 |
| Example 4 | Barium hydroxide | 0.5 | Glucose | 0.5 | 12 | 40 | 7 | 35 |
| Example 5 | Thallium hydroxide | 5 | Trimethyl glucose | 5 | 11 | 50 | 6 | 40 |
| Example 6 | Lead hydroxide | 5 | Fructose | 5 | 12 | 40 | 4 | 22 |
| Example 7 | Magnesium sulfate | 10 | Fructose | 5 | 13.5 | 40 | 6 | 37 |
| Example 8 | Dipotassium hydrogen phosphate | 5 | Fructose | 5 | 12 | 40 | 6 | 31 |
| Example 9 | Potassium dihydrogen phosphate | 5 | Maltose | 5 | 12 | 40 | 6 | 53 |
| Control 1 | None | — | None | — | 3.5 | — | — | 560 |
| Control 2 | Calcium hydroxide | 10 | Fructose | 10 | 6.5 | 60 | 1 | 545 |
| Control 3 | None | — | None | — | 12 | 60 | 7 | 560 |

Note: The amount of reaction catalyst and reaction accelerator are indicated by parts with respect to 72.5 parts of capsule core materials.

What we claim is:

1. A method for removing residual formaldehyde from an aqueous dispersion of microcapsules, each microcapsule having a capsule wall of an aldehyde polycondensation resin formed by polycondensation of formaldehyde with at least one amine in the presence of an acid catalyst comprising the combination of steps:
   (a) adjusting said aqueous dispersion to an alkaline state;
   (b) adding to said alkaline aqueous dispersion at least one reaction catalyst selected from the groups consisting of:
      (i) metal hydroxides,
      (ii) phosphates,
      (iii) calcium salts, and
      (iv) magnesium salts; and
   (c) heating and agitating said alkaline aqueous dispersion to cause a reaction to remove residual formaldehyde therefrom.

2. A method for removing residual formaldehyde from an aqueous dispersion of microcapsules according to claim 1, wherein said aqueous dispersion of microcapsules is adjusted to a pH value within the range of 11.0 to 13.5.

3. A method for removing residual formaldehyde from an aqueous dispersion of microcapsules according to claim 1, wherein said reaction catalyst is used in an amount of 0.01 to 10 mols per 1 mol of said residual formaldehyde in said aqueous dispersion of microcapsules.

4. A method for removing residual formaldehyde from an aqueous dispersion of microcapsules according to claim 1, wherein said reaction to remove residual formaldehyde from said aqueous dispersion of microcapsules is carried out at an elevated temperature of 30° C. to 60° C.

5. A method for removing residual formaldehyde from an aqueous dispersion of microcapsules according to claim 1, wherein said aqueous dispersion further includes at least one member selected from the group consisting of saccharides, their derivatives and acetoin.

6. A method for removing residual formaldehyde from an aqueous dispersion of microcapsules according to claim 5, wherein said aqueous dispersion of microcapsules is adjusted to a pH value within the range of 11.0 to 13.5.

7. A method for removing residual formaldehyde from an aqueous dispersion of microcapsules according to claim 5, wherein said reaction catalyst is used in an amount of 0.01 to 10 mols per 1 mol of said residual formaldehyde in said aqueous dispersion of microcapsules.

8. A method for removing residual formaldehyde from an aqueous dispersion of microcapsules according to claim 5, wherein said reaction to remove residual formaldehyde from said aqueous dispersion of microcapsules is carried out at an elevated temperature of 30° C. to 60° C.

9. A method for removing residual formaldehyde from an aqueous dispersion of microcapsules according to claim 1, wherein in said step (b) said calcium salts are selected from the group consisting of calcium carbonate, calcium chloride, calcium nitrate and calcium sulfate and said magnesium salts are selected from the group consisting of magnesium carbonate, magnesium nitrate, magnesium sulfate, magnesium chloride and magnesium acetate.

* * * * *